No. 759,323. PATENTED MAY 10, 1904.
J. STEPHENS.
STERN TUBE FOR SCREW PROPELLER SHAFTS.
APPLICATION FILED JAN. 31, 1903.
NO MODEL.
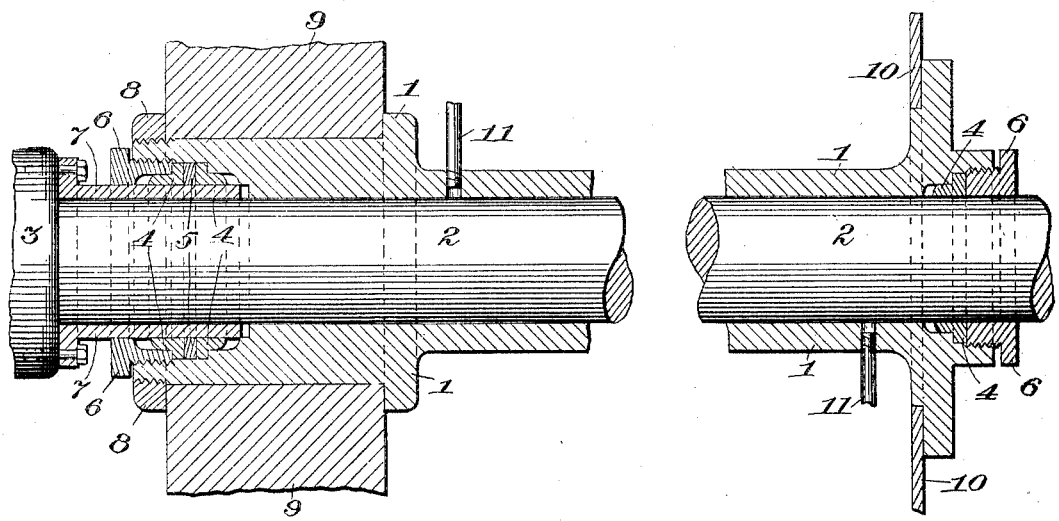
Witnesses:
Sydney George Hunt.
Ambrose Walter Strong
Inventor:
James Stephens No. 759,323. Patented May 10, 1904.

UNITED STATES PATENT OFFICE.

JAMES STEPHENS, OF STONEHOUSE, ENGLAND.

STERN-TUBE FOR SCREW-PROPELLER SHAFTS.

SPECIFICATION forming part of Letters Patent No. 759,323, dated May 10, 1904.

Application filed January 31, 1903. Serial No. 141,372. (No model.)

*To all whom it may concern:*

Be it known that I, JAMES STEPHENS, a citizen of the United Kingdom of Great Britain and Ireland, residing at Stonehouse, in the county of Gloucester, England, have invented Improvements in Stern-Tubes for Screw-Propeller Shafts, of which the following is a specification.

The object of this invention is to provide a stern-tube that will perfectly protect the propeller-shaft from corrosion and at the same time dispense with the costly shaft-casing and provide an efficient arrangement for lubrication with oil or other like lubricant.

In carrying out this invention I construct a metal tube, hereinafter called the "stern-tube," with arrangements for securing it to the stern-frame and to a transverse bulkhead of the ship, according to well-known plans. This stern-tube I bore for the greater part of its length of such a size as to be a good working fit, in which the propeller-shaft may revolve, or of such size larger than the propeller-shaft as to admit of a removable bush being fitted in the stern-tube. I bore the after end of the stern-tube of such size larger than the propeller-shaft as to allow of the insertion of a metal sleeve attached to the propeller-boss and also (outside of this sleeve) to admit two packing-rings, either of the description known to hydraulic engineers as "U-leathers" or of the description known as "hat-leathers," but preferably the latter, and they may be of leather or of any other suitable material, provided they are of the before-named form. In a portion of the length of this enlarged bore I cut a screw-thread, in which I fit a metal nut for securely retaining the said packing-rings in position, or otherwise they may be secured by a gland and bolts. The object of the aftermost of the before-named packing-rings is to secure the exclusion of water from the interior of the stern-tube, while the forward one is for retaining oil or some like lubricant within the stern-tube. I bore the forward end of the stern-tube of such size larger than the propeller-shaft as to admit of fitting one packing-ring of a like description to the before-named packing-rings and a nut for retaining it of like description and in a similar manner to that by which the packing-rings are retained in the after end of the stern-tube. The object of this packing-ring is to retain the oil or some like lubricant within the stern-tube. I also fit a tube into the top of the stern-tube for the supply of oil or some like lubricant and a similar tube into the bottom of the stern-tube for drawing off the lubricant as may be desired.

The above description will be better understood by reference to the accompanying drawing, which is a vertical longitudinal section of the stern-tube and of portions of the stern-frame and transverse bulkhead and also of portions of the propeller-shaft and propeller-boss, not in section, showing the improvements.

1 is the stern-tube; 2, screw-propeller shaft; 3, screw-propeller boss; 4, the packing-rings; 5, a loose metal ring separating the packing-rings; 6, nuts for securing the packing-rings; 7, metal sleeve attached to the propeller-boss; 8, nut for securing stern-tube to stern-frame; 9, stern-frame; 10, transverse bulkhead; 11, oil-tubes.

What I claim as my invention, and desire to secure by Letters Patent, is—

The outer tube in conjunction with the metal sleeve attached to the propeller-boss, the U or hat shaped packing-rings of leather or other suitable material, and the nuts for securing the same, substantially as and for the purpose specified.

In testimony whereof I have signed my name to this specification in the presence of two subscribing witnesses.

JAMES STEPHENS.

Witnesses:
A. GIE,
CECIL G. PALIN.